United States Patent
Guerrero (10) Patent No.: US 9,182,992 B2
(45) Date of Patent: Nov. 10, 2015

(54) METHOD FOR IMPROVING PERFORMANCE OF A PIPELINED MICROPROCESSOR BY UTILIZING PIPELINE VIRTUAL REGISTERS

(71) Applicant: Miguel A Guerrero, San Jose, CA (US)

(72) Inventor: Miguel A Guerrero, San Jose, CA (US)

(73) Assignee: ESENCIA TECHNOLOGIES INC, San Jose, CA (US)

( * ) Notice: Subject to any disclaimer, the term of this patent is extended or adjusted under 35 U.S.C. 154(b) by 416 days.

(21) Appl. No.: 13/914,323

(22) Filed: Jun. 10, 2013

(65) Prior Publication Data

US 2013/0332704 A1 Dec. 12, 2013

Related U.S. Application Data

(60) Provisional application No. 61/657,514, filed on Jun. 8, 2012.

(51) Int. Cl.
G06F 9/06 (2006.01)
G06F 9/38 (2006.01)
G06F 9/30 (2006.01)

(52) U.S. Cl.
CPC ............ *G06F 9/3867* (2013.01); *G06F 9/3012* (2013.01); *G06F 9/30138* (2013.01); *G06F 9/3826* (2013.01); *G06F 9/3891* (2013.01)

(58) Field of Classification Search
CPC .......................................................... G06F 9/06
See application file for complete search history.

(56) References Cited

U.S. PATENT DOCUMENTS

| | | | | | |
|---|---|---|---|---|---|
| 5,828,903 | A | * | 10/1998 | Sethuram | G06F 13/28 709/212 |
| 6,591,359 | B1 | * | 7/2003 | Hass | G06F 9/384 712/217 |
| 7,210,026 | B2 | * | 4/2007 | Damron | G06F 9/30032 711/205 |

* cited by examiner

*Primary Examiner* — Cheng-Yuan Tseng (57) ABSTRACT

A method for improving performance of a pipelined microprocessor by utilizing pipeline virtual registers allows for either decreased register spillage or decreased area and power consumption of a microprocessor. The microprocessor takes advantage of register bypass logic to write short-lived values to virtual registers, which are discarded instead of being written to the register bank, thus reducing register pressure by avoiding short-lived values being written to the register bank.

17 Claims, 9 Drawing Sheets

METHOD FOR IMPROVING PERFORMANCE OF A PIPELINED MICROPROCESSOR BY UTILIZING PIPELINE VIRTUAL REGISTERS

The current application claims a priority to the U.S. Provisional Patent application Ser. No. 61/657,514 filed on Jun. 8, 2012.

FIELD OF THE INVENTION

The present invention relates generally to microprocessors. More particularly, the present invention relates to a technique for improving performance in a pipelined microprocessor by assigning short-lived values to virtual registers in order to minimize register spillage.

BACKGROUND OF THE INVENTION

The pipeline architecture has become the typical design used in many conventional processors due to higher throughput achievements. In pipelining, a sequence of tasks is followed in order to process instructions, such as fetching instructions, decoding instructions, execution, and storing results which are connected through the means of the pipelines. As instruction flow through the pipeline their tasks are sequentially performed by each stage. Each instruction is followed by its next sequential instruction which will occupy as soon as possible the stations which it vacates the time delay between the initiation of different instructions and the completion thereof under the pipeline architecture is therefore compacted and throughout of the computer is increased. Pipelining inserts a set of 'pipeline registers' between combinational units to hold intermediate results at clock boundaries. Typical reduced instruction set computing (RISC) and very long instruction word (VLIW) processors have at least 2-4 pipeline stages between the time a computation is performed in the an arithmetic logic unit (ALU) and the time the resulting value is written into a register file or flip-flop based register bank what is usually known as the write back stage. A register file is found in many data processing units and comprises a plurality of registers. A register file access time represents one of the critical delays of current microprocessors, and it is expected to become more critical as future processors increase the instruction issue width. A standard solution to increase performance in a processor is to implement what is referred to as register forwarding or register bypassing. This implementation method is a technique that compares the source register indexes of the input operands into the ALU in clock cycle n with the results of previous operations (cycles n-1, n-2, . . . ) that have not yet been committed to the register bank. If there is a match, the value 'in flight' to the register bank is used/forwarded or bypassed into the input of the ALU instead of using the value that was read from the register bank temporarily, thus the pipeline registers temporarily are holding these values. Registers are considered live if their value is still expected to be used in a future cycle and when the number of registers live is higher than the number of registers in the micro-processor, the compiler 'spills' some of the values held in those registers onto the stack or a temporary storage memory area so that the registers can be used for other purpose. These register spillages degrades performance due to store instruction and subsequent load from the memory.

It is therefore an object of the present invention to provide a novel and unique approach to reduce register pressure in compilers by providing a set of short lived registers at near-zero cost. These extra registers can be beneficial to avoid register spillage that consequently result in degradation in performance. Thus this feature can effectively increase the performance per area metric on a modern micro-processor, save leakage power while reducing activity in the processor, and most importantly save cost.

DETAIL DESCRIPTIONS OF THE INVENTION

All illustrations of the drawings are for the purpose of describing selected versions of the present invention and are not intended to limit the scope of the present invention.

The present invention is a method for pipeline management of a microprocessor in which register spillage is minimized for registers that are live for an extended period of time. The present invention provides a novel and unique approach to reduce register pressure in compilers by providing a set of short-lived registers at near-zero cost. The only cost associated with implementing the present invention is that extra encoding space must be allowed for register indexes for registers that are not physically implemented. These extra registers, hereinafter known as Pipeline Virtual Registers (PVRs), can be beneficial to avoid register spillage that degrades performance. Thus, the present invention can effectively increase the performance per area metric on a modern microprocessor. Similarly, economizing read or write operations to a register bank provides the additional benefit of incurring power savings for computations of short-lived values since PVRs are not accessed through the register bank.

Figure 1:
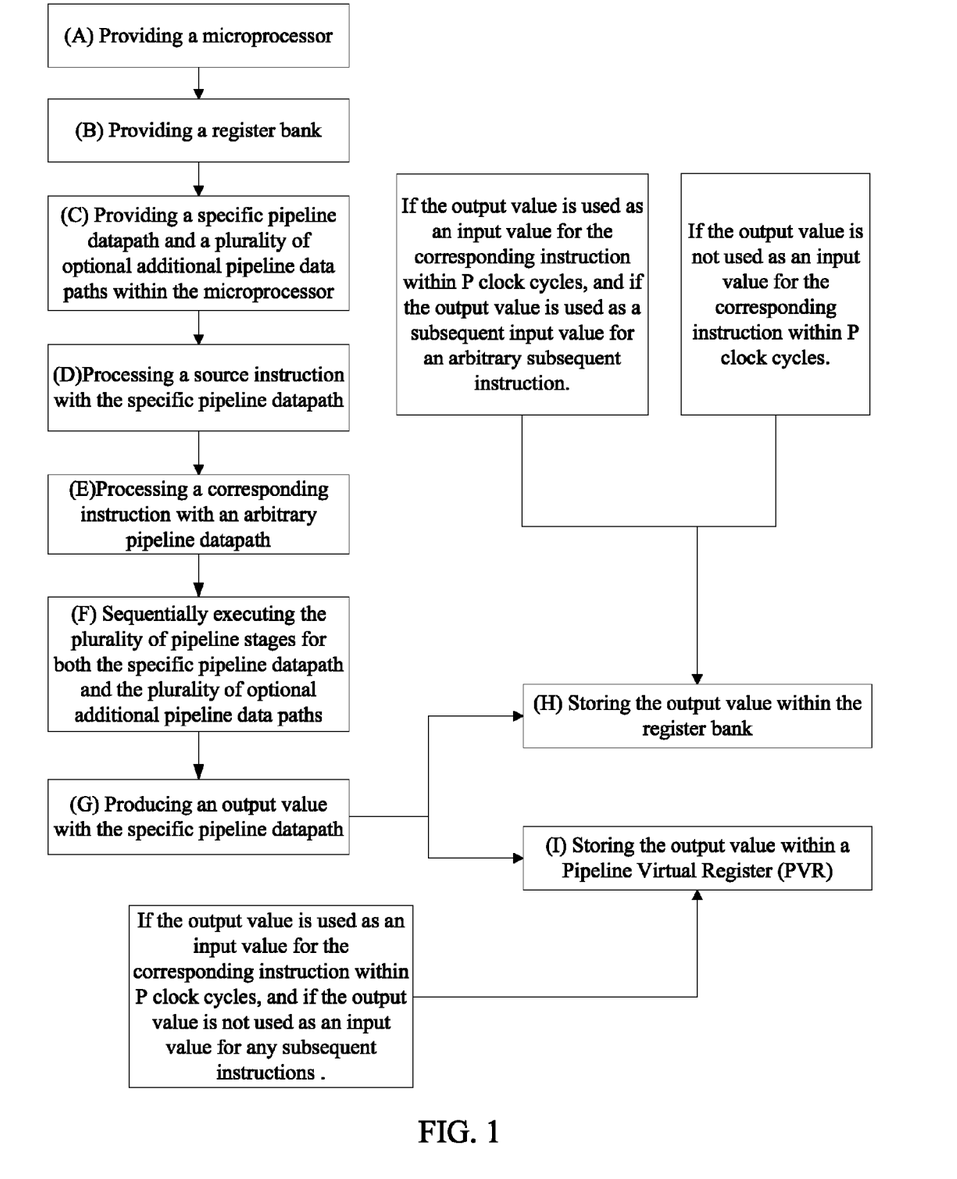
FIG. 1 is a stepwise flow diagram giving a general overview of the process of the present invention.
Figure 8:
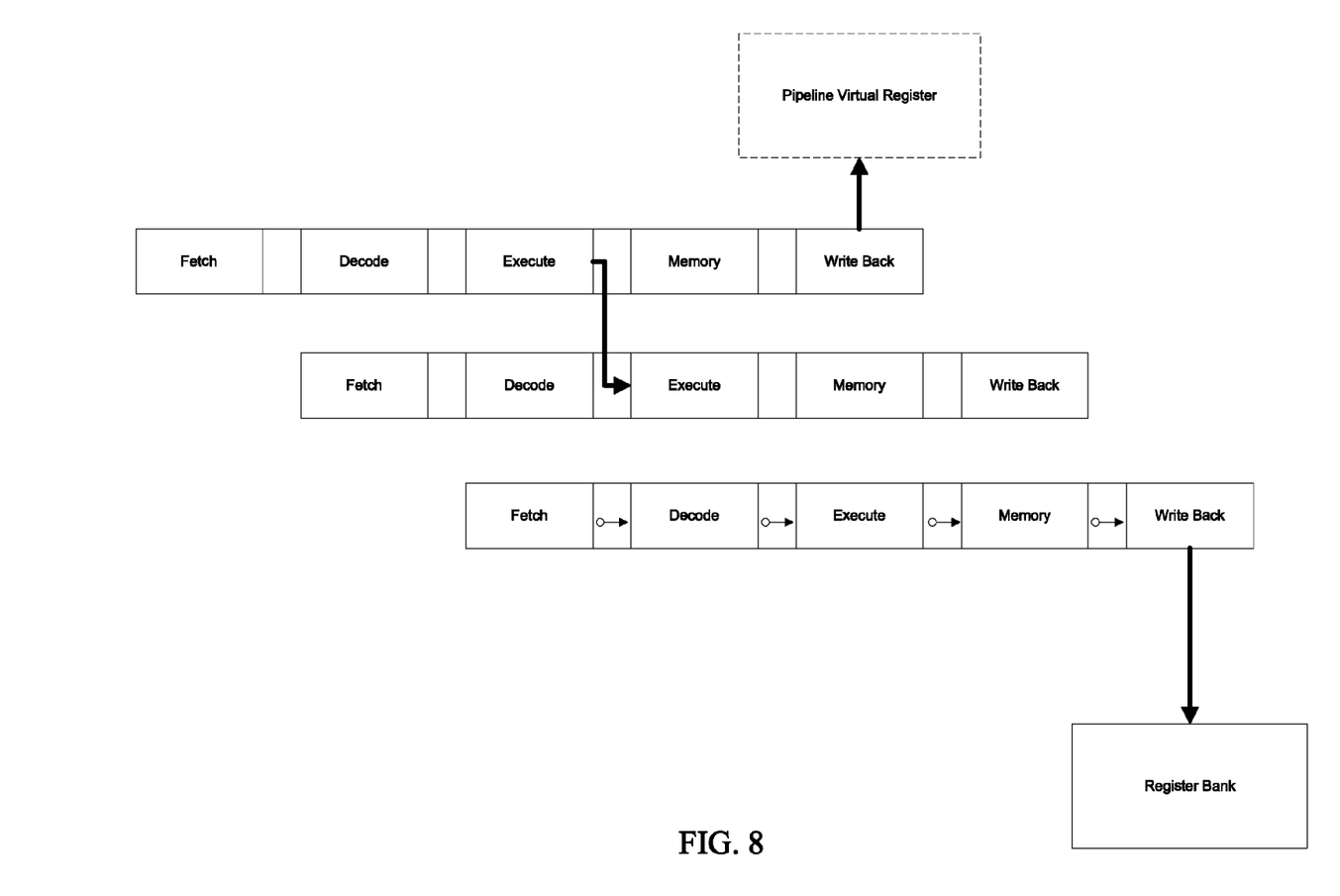
FIG. 8 is a visual depiction of three instructions being executed by a pipeline datapath, wherein the first instruction produces a short-lived output that is immediately consumed by the second instruction, and wherein the third instruction produces a long-lived output that is committed to the register bank.

Referring to FIG. 1, in the process of the present invention, a microprocessor is provided, wherein a periodic clock cycle coordinates commands executed by the microprocessor in a manner common to microprocessors. In the preferred embodiment of the present invention, the microprocessor is a configurable microprocessor with vector capabilities. Additionally, a register bank is provided, wherein the register bank comprises a number of physical registers (R), where R is the number of physical registers implemented in the register bank. Each of the physical registers has a register index value less than or equal to R. Each physical register is a small amount of storage available as part of the microprocessor which is used to hold values for machine instruction. The microprocessor is pipelined in order to achieve higher throughput. Preferably, the microprocessor is pipelined according to the classic RISC (reduced instruction set computing) configuration, in which multiple instructions are executed in an overlapping manner using the same circuitry. A typical instruction processing circuit used in an RISC pipeline comprises five pipelining stages which operate in sequence in order to process instructions: an instruction fetch (IF) stage, an instruction decode (ID) stage, an execute (EX) stage, a memory access (MEM) stage, and a register writeback (WB) stage. Each stage takes one clock cycle to execute. However, with pipelining, multiple pipeline stages may be executed in the same clock cycle. For example, the EX stage of a first instruction, the ID stage of a second instruction, and the IF stage of a third instruction may be simultaneously executed in one clock cycle. An illustration of processing instructions with pipelining is provided in FIG. 8.

Additionally, pipeline registers are implemented between each pipeline stage in order to receive an output from a previous stage and to hold the output stable to be used as an input for a subsequent stage. In pipeline register nomenclature, a particular pipeline register is named for the pipeline stages that precede and succeed the particular pipeline register. For example, a pipeline register between the EX stage and the MEM stage is referred to as an EX/MEM register, and a pipeline register between the MEM stage and the WB stage is referred to as a MEM/WB register.

Although the microprocessor of the present invention is assumed to have the RISC pipeline configuration described above, other pipelining configurations or other pipelining stage configurations may be implemented where appropriate. In pipelining, multiple duplicate instruction processing circuits can be implemented in order to process multiple instructions in an overlapping manner. Each of the instruction processing circuits may be referred to as a pipeline datapath, or simply as a datapath. This is a typical configuration used in VLIW processors.

In particular, a specific pipeline datapath and a plurality of optional additional pipeline datapaths are provided within the processor, wherein N is the total number of datapaths within the microprocessor. As described above, the specific pipeline datapath and the plurality of optional additional pipeline datapaths each comprise a plurality of pipeline stages. The present invention is concerned primarily with the execution stage and the writeback stage. The specific pipeline datapath and the plurality of optional additional pipeline datapaths each comprise a number of pipeline registers (P). To clarify, P refers to the number of pipeline registers between the execution stage and the writeback stage, not the total number of pipeline registers in the datapath. The number of pipeline stages between the execution stage and the writeback stage is P−1. For example, in the classic five stage RISC configuration described above, P is 2, since there two pipeline registers (EX/MEM and MEM/WB) between the EX stage and the WB stage.

In the general process of the present invention, a source instruction is processed with the specific pipeline datapath. The source instruction may be any typical machine instruction that produces an output. Additionally, a corresponding instruction is processed with an arbitrary pipeline datapath, wherein the arbitrary pipeline datapath may be the specific pipeline datapath or one of the plurality of optional additional pipeline datapaths. In the present invention, the corresponding instruction receives an input value from the source instruction. The corresponding instruction is also any typical machine instruction, with the caveat that the corresponding instruction takes the output of the source instruction as the input value for the corresponding instruction. For example, the source instruction adds register 1 to register 2 and stores the result in register 3, and the corresponding instruction adds 10 to register 3 and stores the result in register 4. The plurality of pipeline stages is sequentially executed for both the specific pipeline datapath and the plurality of optional additional pipeline datapaths. In the preferred embodiment of the present invention, the corresponding instruction is initialized at least one clock cycle after the source instruction is initialized by the microprocessor.

The specific pipeline datapath produces an output value for the first instruction. The output value is first produced in the EX stage of the specific pipeline datapath at clock cycle t and is stored in the EX/MEM register of the specific pipeline datapath. As the specific pipeline datapath progresses, the MEM stage receives the output value from the EX/MEM register in clock cycle t+1, and the output value is also passed down the specific pipeline datapath to the MEM/WB register. In clock cycle t+2, the WB stage receives the output value from the MEM/WB register and writes the output value to a particular register. The particular register is chosen by a compiler. The compiler performs the function of allocating various output values from various pipeline datapaths to various registers in the register bank.

At compile time, the compiler analyzes inputs and outputs for every instruction processed by the microprocessor in order to determine whether any given output is used as an input for an arbitrary subsequent instruction. In compiler terminology, a value is considered to be "live" if the value is expected to be used as an input in a future instruction, whereas the value is considered to be "dead" if the value is not used in a future instruction. Additionally, a value is considered to be short-lived if the value is consumed within a small number of clock cycles; that is, if the value is used as an input for a subsequent instruction, after which the value is dead, wherein the subsequent instruction occurs a small number of clock cycles after the value is produced. The small number of clock cycles is preferably equal to or lesser than P. Whenever possible, the compiler directs the WB stage to write an output value for an instruction to a register holding a dead value. However if, in a given clock cycle, the number of live values exceeds the number of registers in the register bank, the compiler writes some of the live values held in the register bank onto memory in order to accommodate all of the live values. This degrades performance since writing to and subsequently reading from memory is much slower than holding live values in the register bank. This is known as register spillage.

In pipelined microprocessors, a technique known as register forwarding or register bypassing is used to achieve higher throughput. This technique compares source register indexes of input operands into the EX stage for a first datapath with in-flight results of previous operations of other datapaths that have not been committed to the register bank. If there is a match, the matching in-flight result is bypassed directly into the first datapath's EX stage instead of waiting for the in-flight result to be committed to the register bank and subsequently retrieving the required value from the register bank. This improves performance significantly as the time required to complete sequential instructions is typically reduced by two or more clock cycles.

Figure 2:
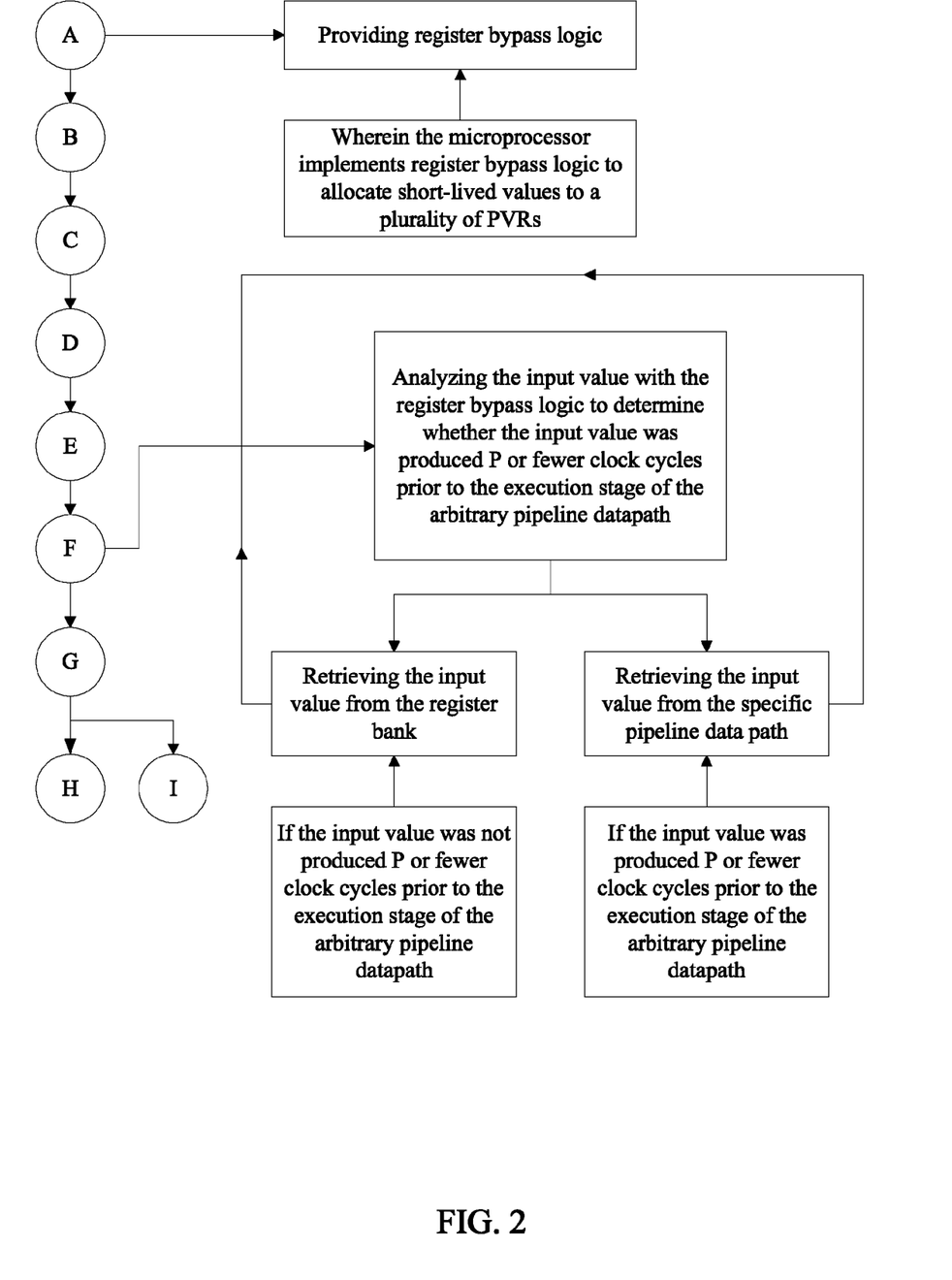
FIG. 2 is a stepwise flow diagram describing the register bypass logic for processing instructions.
Figure 3:
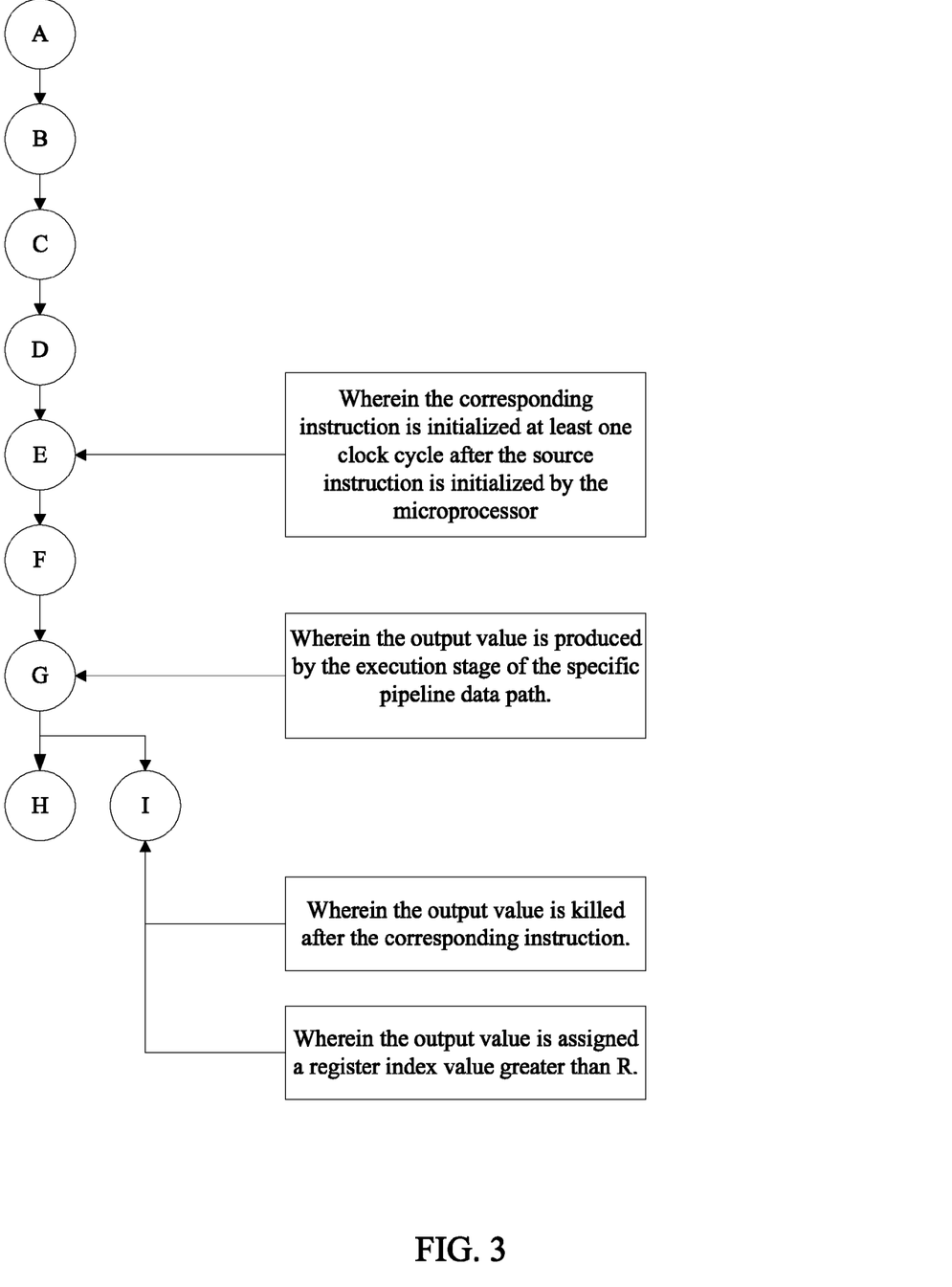
FIG. 3 is a stepwise flow diagram describing various aspects of the present invention.

Referring to FIG. 2, register bypassing is executed by the microprocessor using register bypass logic provided to the microprocessor. The register bypass logic is able to access the specific pipeline datapath and the plurality of optional additional pipeline datapaths and, by extension, all pipeline registers within the specific pipeline datapath and the plurality of optional additional pipeline datapaths. Using the register bypass logic, the register index containing the input value for the corresponding instruction is analyzed to determine whether the input value was produced P or fewer clock cycles prior to the EX stage of the arbitrary pipeline datapath. If the input value was not produced P or fewer clock cycles prior to the EX stage of the arbitrary pipeline datapath, the input value is retrieved from the register bank. If the input value was produced P or fewer clock cycles prior to the EX stage of the arbitrary pipeline datapath, the input value is retrieved from the specific pipeline datapath.

Referring to FIGS. 1-3 and 8, the primary unique aspect of the present invention is implementing pipeline virtual registers (PVRs) when dealing with short-lived values in order to save registers for longer lived values. If the output value produced by the specific datapath is not used as the input value for the corresponding instruction within P clock cycles (in other words, if the compiler detects that the output value is not short-lived), the output value is stored within the register bank. Additionally, if the output value is used as an input value for the corresponding instruction within P clock cycles, and if the output value is used as a subsequent input value for an additional arbitrary subsequent instruction, the output value is stored within the register bank, wherein the future arbitrary subsequent instruction uses the output value as a subsequent input value after P clock cycles.

However, if the output value is used as an input value for the corresponding instruction within P clock cycles, and if the output value is not used as an input value for any subsequent instructions after the corresponding instruction, the output value is stored within a PVR. In other words, the output value is killed after the corresponding instruction. The output value is stored within a PVR by assigning the output value a register index value greater than R, where R is the number of physical registers implemented in the register bank. For example, R is 32, with physical registers 1 to 32 available to the microprocessor. The output value is assigned to a PVR by assigning the output value a register index value of 33 or higher. Once the output value reaches the WB stage in the specific pipeline datapath, the output value is written to the $33^{rd}$ register index. However, since there is no $33^{rd}$ register available, the output value is simply discarded and is not assigned to a physical register.

The result of this process is that short-lived values are never written to the register bank, and as such the register bank is freed to hold longer-lived values. For example, in a certain clock cycle there may be 40 live values, of which 15 are short-lived values, whereas only 32 physical registers are available. Without the technique of the present invention, 8 of the 40 live values must be spilled onto memory, incurring a performance reduction. With the technique of the present invention being implemented, the register bank never receives the 15 short-lived values, because the 15 short-lived values are bypassed to the required inputs and assigned to PVRs. This reduces the number of live values in the register bank to 25, so no values must be spilled into memory, and no performance reduction is incurred.

To further describe the present invention, a total number of accessible registers (A) is provided, wherein A is initially equal to R, which is the number of physical registers in the register bank. This initial state is equivalent to a microprocessor without the technique of the present invention being implemented.

Figure 4:
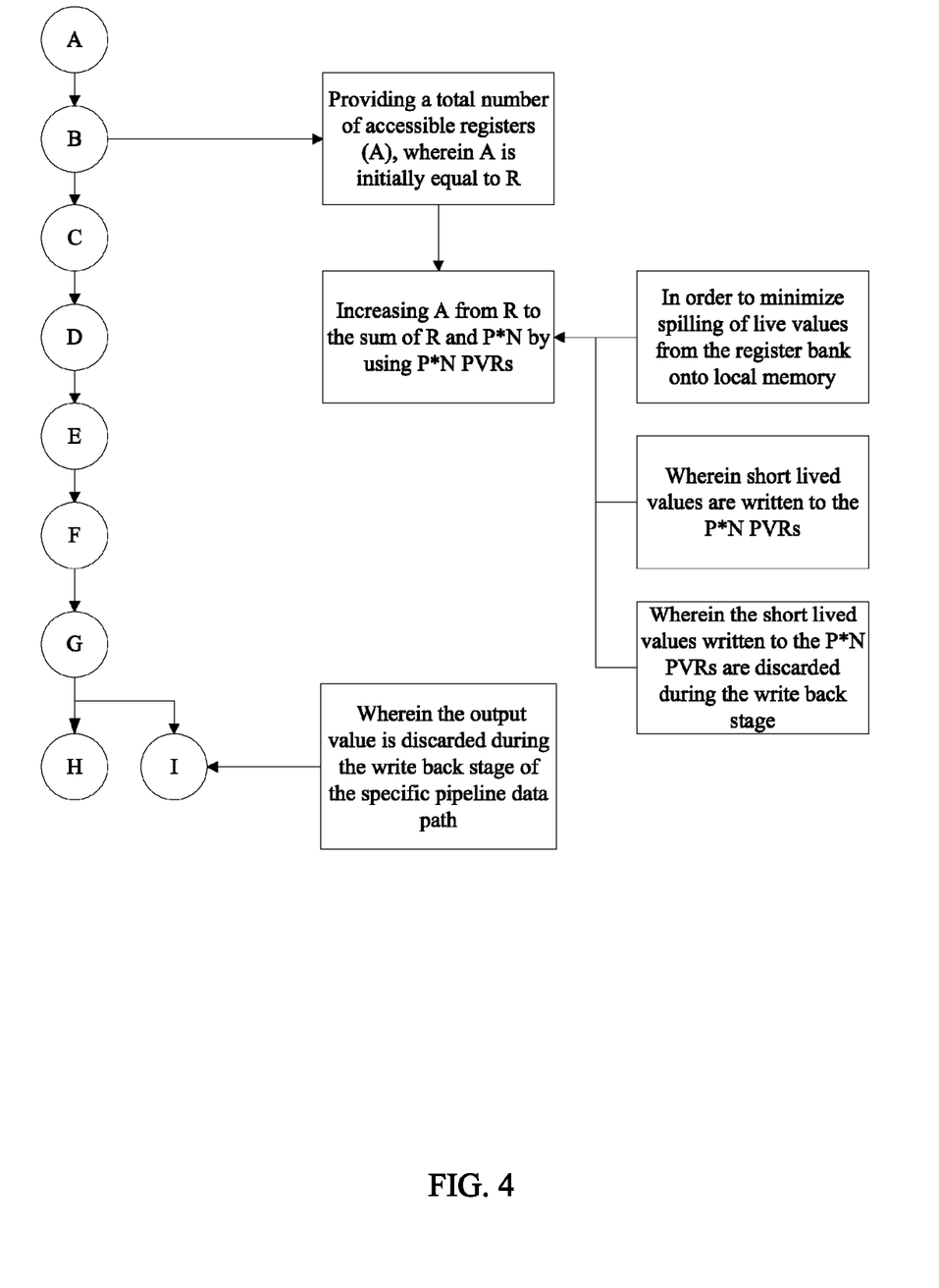
FIG. 4 is a stepwise flow diagram describing an embodiment of the present invention in which register spillage is minimized.

Referring to FIG. 4, in a first embodiment of the present invention, A is increased from R to the sum of R and P*N in order to minimize spilling of live registers from the register bank onto local memory by using P*N PVRs. Only short lived values are written to the P*N PVRs, and the short lived values written to the P*N PVRs are discarded during the WB stage. This embodiment effectively increases the number of registers available to the microprocessor for holding short-lived values, resulting in decreased register spillage.

Figure 5:
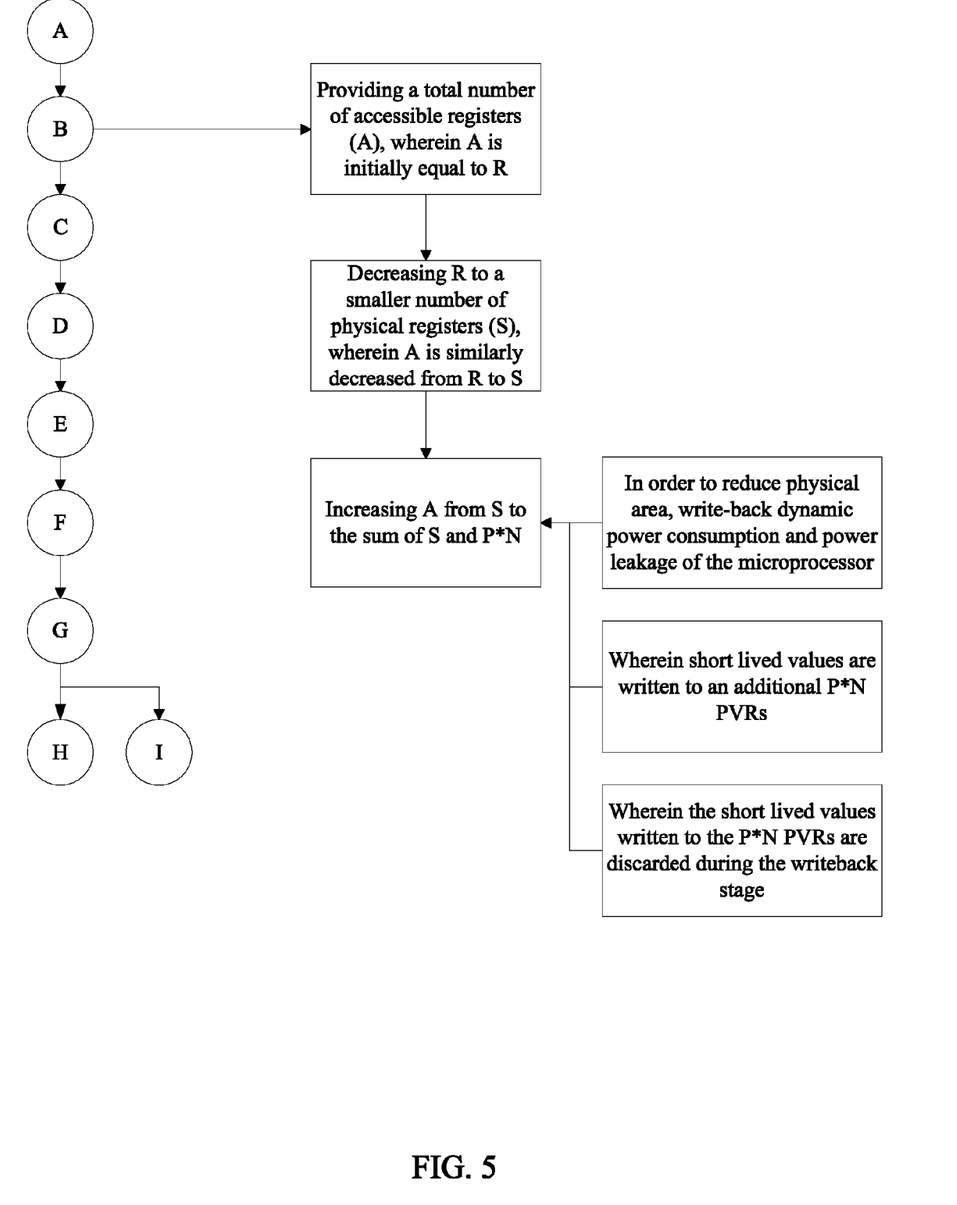
FIG. 5 is a stepwise flow diagram describing an embodiment of the present invention in which physical area, writeback dynamic power consumption and power leakage are reduced.

Referring to FIG. 5, in a second embodiment of the present invention, R is decreased to a smaller number of physical registers (S), wherein A is similarly decreased from R to S. However, A is also increased from S to the sum of S and P*N. Again, only short lived values are written to the P*N PVRs, and the short lived values written to the P*N PVRs are discarded during the WB stage. In this embodiment, the number of physical registers being implemented is decreased, reducing the physical area required for the processor, which has the additional effects of decreased cost, decreased write-back dynamic power consumption and decreased leakage power of the microprocessor (since leakage power is proportional to area), while still decreasing register spillage or at least maintaining a typical amount of register spillage.

The technique of the present invention is particularly interesting and useful for Very Long Instruction Word (VLIW) processors where the number of pipeline registers increases proportionally to the number of slots or independent datapaths that the VLIW processor features. For example, a vector processor implementing vectors of 8 items with 32 bits each use 256 Flip-Flops (FFs) per register (if implemented as FFs.) Building on this example, if P=4 and N=16, 64 additional registers can be available for short lived values at no extra cost. 64 registers at 256 bits each equals approximately 16,000 FFs, which is roughly equivalent to 500-1000K gates saving per processor instance after accounting for FF plus associated multiport read/write logic area. The benefits of the technique of the present invention are more relevant for VLIW, VLIW-like and/or vector processor architectures featuring high data level parallelism and/or having multiple parallel datapaths, but the present invention is not restricted to these cases.

Figure 6:
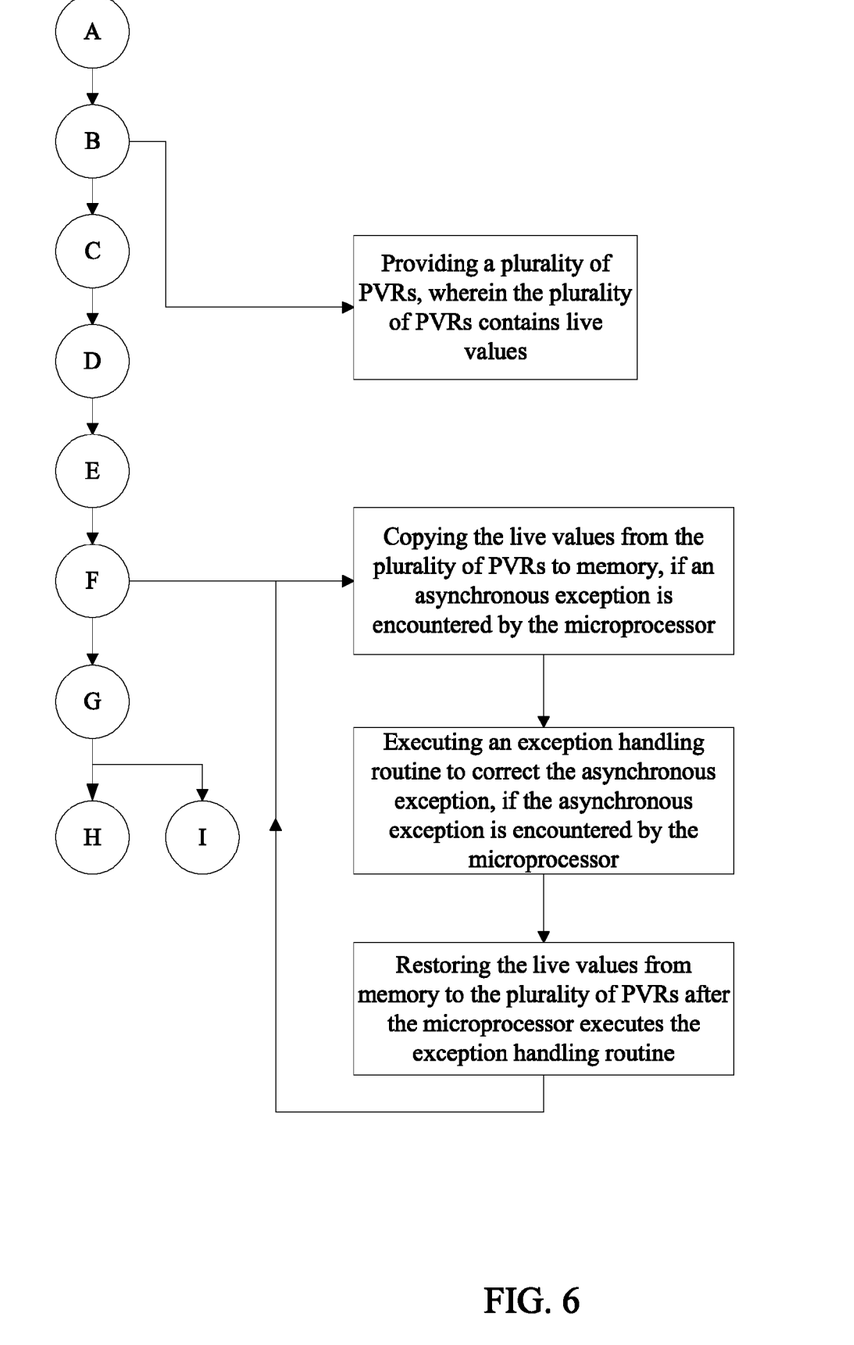
FIG. 6 is a stepwise flow diagram describing how the microprocessor handles PVRs with regard to asynchronous exceptions.

In the preferred embodiment of the present invention, a number of mechanisms are implemented to handle PVRs with regard to exceptions. Referring to FIG. 6, the microprocessor is provided with a plurality of PVRs that contain live values while executing instructions, and further comprises PVR exception hardware to deal with the plurality of PVRs during exception handling. If an asynchronous exception is encountered by the microprocessor, the PVR exception hardware automatically copies the live values from the plurality of PVRs to memory. An exception handling routine is then executed to correct the asynchronous exception. The live values are then restored to the plurality of PVRs from memory after the microprocessor executes the exception handling routine.

Figure 7:
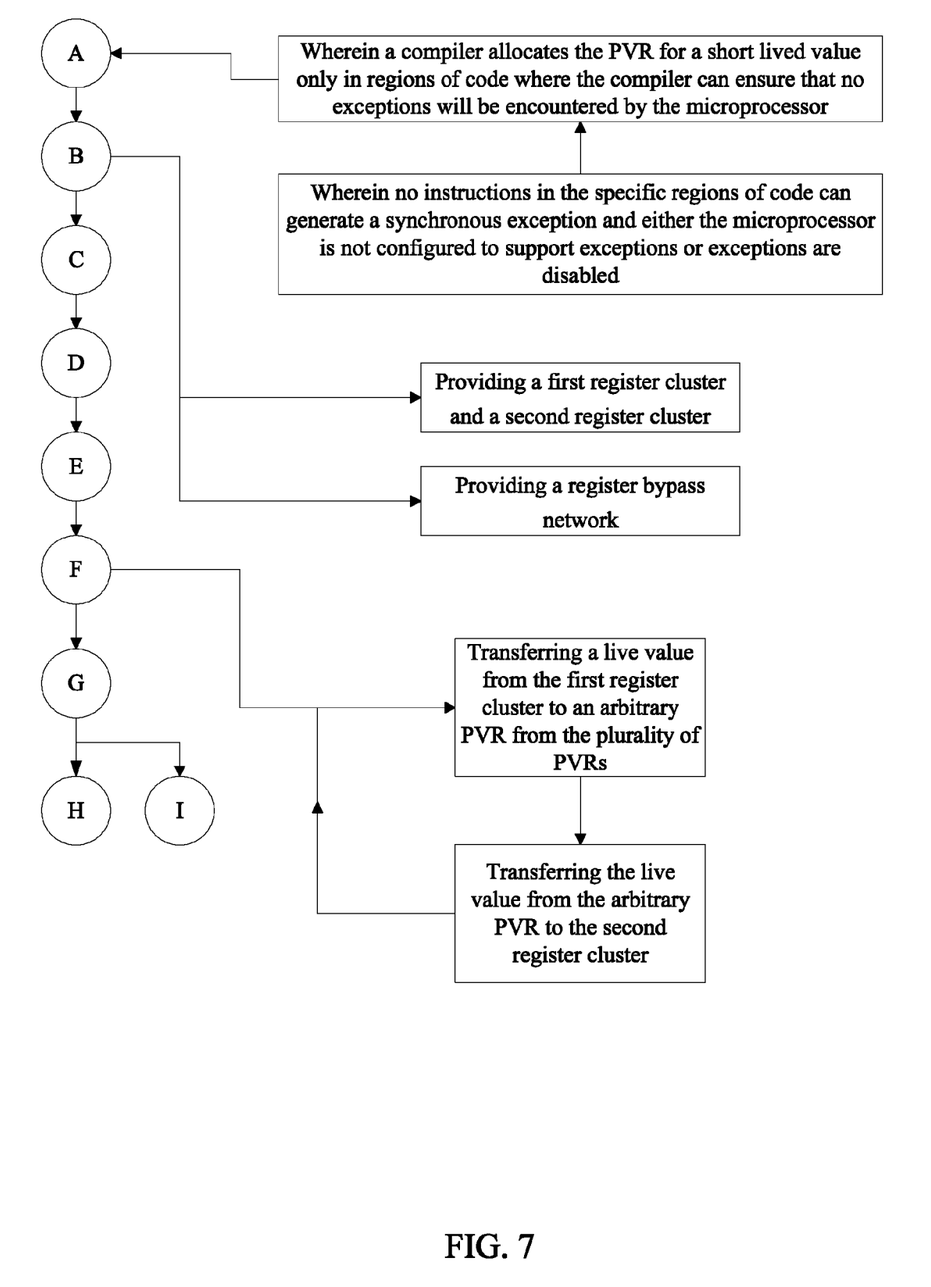
FIG. 7 is a stepwise flow diagram describing when PVRs are implemented for avoiding synchronous exceptions and describing register cluster communication using PVRs.

Referring to FIG. 7, in another embodiment, another way the PVRs are handled with regard to exceptions is that the compiler allocates PVRs for short lived values only in specific regions of code where the compiler can ensure that no exceptions will be encountered by the microprocessor. To clarify, in this embodiment, no instructions in the specific regions of code can generate a synchronous exception. Additionally, the microprocessor is either not configured to support exceptions, or exceptions are disabled for the microprocessor in the specific regions of code where PVRs are in use.

Figure 9:
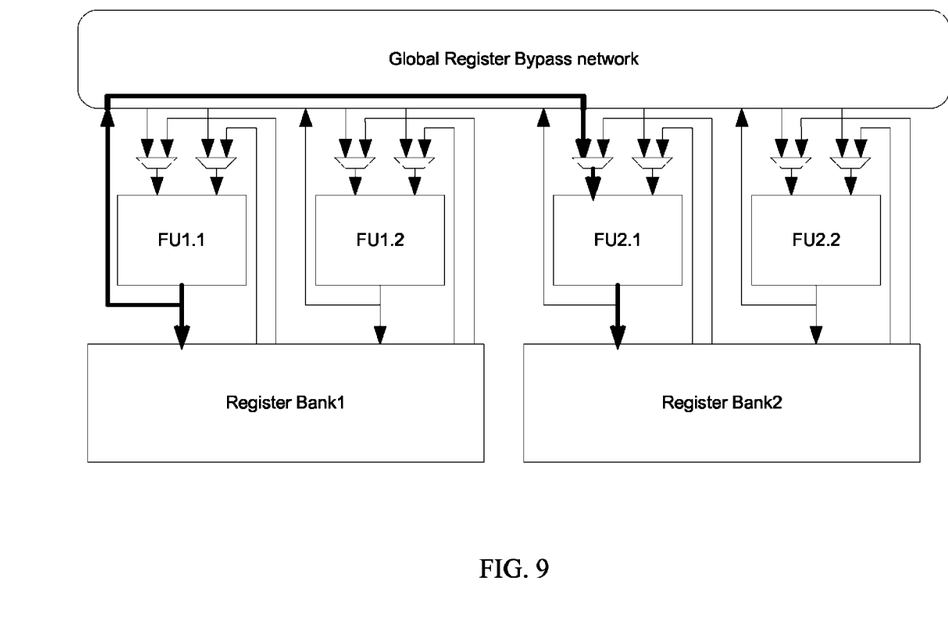
FIG. 9 is a block diagram of an example of a global register bypass network that can be used as a mechanism to transfer data between two register clusters using the process of the present invention.

Referring to FIGS. 7 and 9, one additional benefit to the technique of the present invention is cluster-to-cluster communication in a processor architecture with a clustered register bank. Typically, clustered registers cannot directly communicate with each other without incurring the cost of an extra physical port between clusters. With a register bypass network provided with a plurality of PVRs, register clusters are enabled to communicate with each other. For example, a first register cluster and a second register cluster are provided, wherein the first register cluster and the second register cluster cannot directly communicate with each other. Utilizing the technique of the present invention, a live value may be transferred from the first register cluster to an arbitrary PVR from the plurality of PVRs. The live value may then be transferred from the arbitrary PVR to the second register cluster. This may occur because each of the register clusters is able to access the register bypass network. Data produced by a first functional unit in the first register cluster may be used as a source operand of a second functional unit in the second register cluster, producing a result in the second register cluster. The mechanism of the present invention makes it possible to directly operate on a result from the first cluster in the second cluster without an explicit move, as long as the result of the operation in the first cluster is a PVR.

Although the invention has been explained in relation to its preferred embodiment, it is to be understood that many other possible modifications and variations can be made without departing from the spirit and scope of the invention as hereinafter claimed.

What is claimed is:

1. A method for improving performance of a pipelined microprocessor by utilizing pipeline virtual registers, the method comprises the steps of:
   providing a microprocessor, wherein a periodic clock cycle coordinates commands executed by the microprocessor;
   providing a register bank, wherein the register bank comprises a number of physical registers (R);
   providing a specific pipeline datapath and a plurality of optional additional pipeline datapaths within the microprocessor,
   wherein N is the total number of pipeline datapaths;
   wherein the specific pipeline datapath and the plurality of optional additional pipeline datapaths each comprise a plurality of pipeline stages;
   wherein the plurality of pipeline stages includes an execution stage and a writeback stage;
   wherein the execution stage occurs before the writeback stage;
   wherein the specific pipeline datapath and the plurality of optional additional pipeline datapaths each comprise a number of pipeline registers (P) between the execution stage and the writeback stage;
   processing a source instruction with the specific pipeline datapath;
   processing a corresponding instruction with an arbitrary pipeline datapath, wherein the arbitrary pipeline datapath is either the specific pipeline datapath or one of the plurality of optional additional pipeline datapaths;
   sequentially executing the plurality of pipeline stages for both the specific pipeline datapath and the plurality of optional additional pipeline datapaths;
   producing an output value with the specific pipeline datapath;
   storing the output value within the register bank, if the output value is not used as an input value for the corresponding instruction within P clock cycles;
   storing the output value within the register bank,
   if the output value is used as an input value for the corresponding instruction within P clock cycles; and
   if the output value is used as a subsequent input value for a future arbitrary subsequent instruction,
   wherein the future arbitrary subsequent instruction uses the output value as a subsequent input value after P clock cycles;
   storing the output value within a Pipeline Virtual Register (PVR),
   if the output value is used as an input value for the corresponding instruction within P clock cycles, and
   if the output value is not used as an input value for any subsequent instructions.

2. The method for improving performance of a pipelined microprocessor by utilizing pipeline virtual registers as claimed in claim 1, the method comprises the steps of:
   providing register bypass logic, wherein the register bypass logic is able to access the specific pipeline datapath and the plurality of optional additional pipeline datapaths;
   analyzing the input value with the register bypass logic to determine whether the input value was produced P or fewer clock cycles prior to the execution stage of the arbitrary pipeline datapath;
   retrieving the input value from the register bank, if the input value was not produced P or fewer clock cycles prior to the execution stage of the arbitrary pipeline datapath; and
   retrieving the input value from the specific pipeline datapath, if the input value was produced P or fewer clock cycles prior to the execution stage of the plurality of optional additional pipeline datapaths.

3. The method for improving performance of a pipelined microprocessor by utilizing pipeline virtual registers as claimed in claim 1, wherein the corresponding instruction is initialized at least one clock cycle after the source instruction is initialized by the microprocessor.

4. The method for improving performance of a pipelined microprocessor by utilizing pipeline virtual registers as claimed in claim 1, wherein the output value is killed after the corresponding instruction.

5. The method for improving performance of a pipelined microprocessor by utilizing pipeline virtual registers as claimed in claim 1, wherein each of the R physical registers has a register index value less than or equal to R.

6. The method for improving performance of a pipelined microprocessor by utilizing pipeline virtual registers as claimed in claim 5, wherein the output value is assigned a register index value greater than R.

7. The method for improving performance of a pipelined microprocessor by utilizing pipeline virtual registers as claimed in claim 1, wherein the output value is produced by the execution stage of the specific pipeline datapath.

8. The method for improving performance of a pipelined microprocessor by utilizing pipeline virtual registers as claimed in claim 1, wherein P−1 is the number of pipeline stages between the execution stage and the writeback stage.

9. The method for improving performance of a pipelined microprocessor by utilizing pipeline virtual registers as claimed in claim 1, wherein the output value is discarded during the writeback stage of the specific pipeline datapath.

10. The method for improving performance of a pipelined microprocessor by utilizing pipeline virtual registers as claimed in claim 1, wherein the microprocessor is a configurable microprocessor with vector capabilities.

11. The method for improving performance of a pipelined microprocessor by utilizing pipeline virtual registers as claimed in claim 1, the method comprises the steps of:
- providing a total number of accessible registers (A), wherein A is initially equal to R; and
- increasing A from R to the sum of R and P*N in order to minimize spilling of live values from the register bank onto local memory by using P*N PVRs,
- wherein short lived values are written to the P*N PVRs;
- wherein the short lived values written to the P*N PVRs are discarded during the writeback stage.

12. The method for improving performance of a pipelined microprocessor by utilizing pipeline virtual registers as claimed in claim 1, the method comprises the steps of:
- providing a total number of accessible registers (A), wherein A is initially equal to R;
- decreasing R to a smaller number of physical registers (S), wherein A is similarly decreased from R to S; and
- increasing A from S to the sum of S and P*N in order to reduce physical area, write-back dynamic power consumption and power leakage of the microprocessor,
- wherein short lived values are written to an additional P*N PVRs;
- wherein the short lived values written to the additional P*N PVRs are discarded during the writeback stage.

13. The method for improving performance of a pipelined microprocessor by utilizing pipeline virtual registers as claimed in claim 1, wherein the microprocessor implements register bypass logic to allocate short-lived values to a plurality of PVRs.

14. The method for improving performance of a pipelined microprocessor by utilizing pipeline virtual registers as claimed in claim 1, the method comprises the steps of:
- providing a plurality of PVRs, wherein the plurality of PVRs contains live values;
- copying the live values from the plurality of PVRs to memory, if an asynchronous exception is encountered by the microprocessor;
- executing an exception handling routine to correct the asynchronous exception, if the asynchronous exception is encountered by the microprocessor; and
- restoring the live values from memory to the plurality of PVRs after the microprocessor executes the exception handling routine.

15. The method for improving performance of a pipelined microprocessor by utilizing pipeline virtual registers as claimed in claim 1, wherein a compiler allocates the PVR for a short lived value only in regions of code where the compiler can ensure that no exceptions will be encountered by the microprocessor.

16. The method for improving performance of a pipelined microprocessor by utilizing pipeline virtual registers as claimed in claim 15, wherein no instructions in the specific regions of code can generate a synchronous exception and either the microprocessor is not configured to support exceptions or exceptions are disabled.

17. The method for improving performance of a pipelined microprocessor by utilizing pipeline virtual registers as claimed in claim 1,
- providing a register bypass network, wherein the register bypass network comprises a plurality of PVRs;
- providing a first register cluster and a second register cluster,
- wherein the first register cluster and the second register cluster cannot directly communicate with each other;
- transferring a live value from the first register cluster to an arbitrary PVR from the plurality of PVRs; and
- transferring the live value from the arbitrary PVR to the second register cluster.

* * * * *